(12) United States Patent
Owens et al.

(10) Patent No.: US 8,882,410 B2
(45) Date of Patent: Nov. 11, 2014

(54) DRILLING TOOL

(75) Inventors: Helen Mary Owens, Philadelphia, PA (US); Stephen A. Staud, Springfield, PA (US); Michael W. Malinowski, Lumberton, NJ (US); Emily Sprik, Media, PA (US)

(73) Assignee: The Boeing Company, Chicago, IL (US)

( * ) Notice: Subject to any disclaimer, the term of this patent is extended or adjusted under 35 U.S.C. 154(b) by 628 days.

(21) Appl. No.: 13/217,599

(22) Filed: Aug. 25, 2011

(65) Prior Publication Data

US 2013/0051945 A1   Feb. 28, 2013

(51) Int. Cl.
*B23B 47/28* (2006.01)
*B29C 35/02* (2006.01)

(52) U.S. Cl.
CPC ............... *B23B 47/287* (2013.01); *B29C 35/02* (2013.01); *B23B 2215/04* (2013.01); *B23B 2226/275* (2013.01)
USPC ...................... 408/1 R; 408/115 R; 408/72 B

(58) Field of Classification Search
CPC ...... B23B 35/00; B23B 41/00; B23B 47/287; B23B 47/28; B23B 49/02; B23B 49/026; B23B 2215/04; B23B 2220/00; B23B 2226/36; B23B 2226/33; B23B 2226/61; B23B 2228/36; B23B 2240/21
USPC ...... 408/19, 19 R, 95, 97, 115 R, 72 R–72 B; 219/212, 528, 544, 545; 156/330, 156/307.7, 275.5; 29/560–650
See application file for complete search history.

(56) References Cited

U.S. PATENT DOCUMENTS

| | | | | |
|---|---|---|---|---|
| 3,940,592 A | * | 2/1976 | Shimizu et al. | 219/548 |
| 4,556,439 A | * | 12/1985 | Bannink, Jr. | 156/92 |
| 4,655,480 A | * | 4/1987 | Thalmann | 285/21.2 |
| 5,066,171 A | * | 11/1991 | Arai et al. | 408/1 R |

(Continued)

FOREIGN PATENT DOCUMENTS

| | | |
|---|---|---|
| DE | 102005004485 A1 | 8/2006 |
| FR | 2919691 A1 | 2/2009 |
| IT | 573450 * | 2/1958 |

OTHER PUBLICATIONS

European Search Report in corresponding European Patent Application No. EP 12 17 4410, published by the European Patent Office, Nov. 15, 2012.

(Continued)

*Primary Examiner* — Andrea Wellington
*Assistant Examiner* — Nicole N Ramos
(74) *Attorney, Agent, or Firm* — Ostrager Chong Flaherty & Broitman P.C.

(57) ABSTRACT

A tool and method for drilling holes through first and second structural members having a layer of liquid shim disposed between the first and second structural members. The tool has a drill jig with apertures defining a location for the holes to be drilled in the structural members and a heat blanket coupled to at least a portion of a bottom surface of the drill jig. The tool is coupled to one of the structural members in an area proximate the liquid shim. The heat blanket is activated to raise the temperature of the liquid shim past a curing temperature for a pre-determined period of time. Holes are then drilled through the holes in the drill jig, into the structural members and the liquid shim.

12 Claims, 10 Drawing Sheets

(56) References Cited

U.S. PATENT DOCUMENTS

| | | | |
|---|---|---|---|
| 5,104,468 A * | 4/1992 | de Jong | 156/166 |
| 5,601,315 A * | 2/1997 | Bunger et al. | 285/21.2 |
| 5,685,674 A * | 11/1997 | Tåquist et al. | 409/132 |
| 5,732,732 A * | 3/1998 | Gross et al. | 137/318 |
| 6,264,055 B1 * | 7/2001 | Dozier | 220/483 |
| 6,270,603 B1 | 8/2001 | Westerman et al. | |
| 6,964,546 B1 * | 11/2005 | Vakil | 408/110 |
| 7,189,034 B1 * | 3/2007 | Zeilinger et al. | 408/1 R |
| 7,955,459 B2 * | 6/2011 | Chen et al. | 156/73.5 |
| 2005/0084344 A1 | 4/2005 | Dods et al. | |
| 2005/0145036 A1 | 7/2005 | Keener et al. | |
| 2008/0000894 A1 * | 1/2008 | Baarman | 219/601 |
| 2008/0060757 A1 * | 3/2008 | Hable et al. | 156/325 |
| 2008/0124520 A1 | 5/2008 | Kondo et al. | |
| 2011/0028061 A1 | 2/2011 | Sanderson et al. | |

OTHER PUBLICATIONS

"Quick Cure Long-Shelf-Life Liquid Shim", available at http://www.dtic.mil/dticasd/sbir/sbir032/sbir260.html, retrieved on Aug. 25, 2011.

"Hysol EA 9394 Epoxy Paste Adhesive" Information Document, available at https://tds.us.henkel.com//NA/UT/HNAUTTDS.nsf/web/D61948C932B43DF38525715C001BD400/$File/Hysol_EA_9394-EN.pdf, retrieved on Aug. 25, 2011.

"Hysol Liquid Shims for Aerospace Components" brochure, available at http://www.henkelna.com/us/content_data/LT4533_TT_Aerospace_Liquid_Shim.pdf, retrieved on Aug. 25, 2011.

* cited by examiner

DRILLING TOOL

TECHNICAL FIELD

This disclosure relates to drilling tools for use with liquid shims and more particularly to a drilling tool facilitating both elevated temperature curing of liquid shim and drill jig functions.

BACKGROUND

Structural members, such as composite structures used in the aerospace industry, are often joined together by drilling holes through the structural members and fastening the members together with bolts or other such fastening devices. To ensure proper drilling of holes and an appropriate fit, it is generally desired to have as tight an interface between the structural members as possible. However, due to part size, shape, and tolerances, voids or gaps often exist between such structural members.

A liquid shim can be used to reduce or eliminate a void or gap between such structural members so that holes can be drilled with precision and when bolts are applied, the interface between the structural members is tight. Liquid shim is typically a viscous, sticky resin. Examples of common liquid shims include epoxy resin material with a high compressive strength. When voids or gaps are found between two structural members, the liquid shim is applied between the structural members in an amount sufficient to fill the void or gap, and given time to cure to a hardened material. The liquid shim may be cured either at room temperature or at elevated temperatures. The application of heat greatly speeds up the curing process. Holes are subsequently drilled through the structural members and the liquid shim to permit the fastening devices to be applied.

Current methods of drilling holes in structural members when utilizing liquid shim typically require a large amount of time, a large number of steps and number of tools, and a large amount of manpower to apply and remove the tools. For example, in typical methods the liquid shim is first applied between the structural members and a special curing tool is applied to the structural members to cure the liquid shim. The curing tools then need to be removed before the drilling process begins. Once removed, drilling tools such as a drill jig may be applied to drill the holes through the structural members and the liquid shim Thus, current methods of drilling holes when utilizing liquid shim are inefficient.

SUMMARY

Accordingly, in a first aspect of the disclosure, a tool for drilling holes in a structural member that utilizes liquid shim is provided, which is capable of both curing the liquid shim and drilling the holes without removing the tool from the structural member. The tool comprises a drill jig defining at least one hole and a heat blanket coupled to at least a portion of the bottom surface of the drill jig. The heat blanket may define at least one hole substantially axially aligned with and of at least the diameter of the at least one hole defined by the drill jig.

In another aspect of the disclosure, a tool is provided for drilling holes through a first structural member and a second structural member having a layer of liquid shim disposed between the first and second structural members. The tool comprises a drill jig having apertures defining a location for the holes to be drilled and a heat blanket coupled to at least a portion of the bottom surface of the drill jig. The heat blanket may have apertures substantially axially aligned with and of at least the diameter of the apertures in the drill jig. The tool is used by coupling the tool to one of the structural members proximate an area of the liquid shim such that the heat blanket is adjacent the structural member.

In yet another aspect of the disclosure, a method of drilling holes in a first and second structural member having a layer of liquid shim disposed therebetween is provided. The method comprises providing a drilling tool comprising a drill jig defining holes coupled to a heat blanket, the heat blanket being coupled to at least a portion of the bottom surface of the drill jig, coupling the drilling tool to one of the structural members in an area proximate the liquid shim, activating the heat blanket to raise the temperature of the liquid shim past a curing temperature, waiting for the liquid shim to cure, drilling holes, through the holes in the drill jig and the heat blanket, into and through the first structural member, the second structural member, and the cured liquid shim, and removing the tool from the structural member.

Other objects, features and advantages will be apparent when the detailed description of the preferred embodiments is considered in conjunction with the drawings.

BRIEF DESCRIPTION OF THE DRAWINGS

Reference will now be made to the drawings, in which similar elements in different drawings bear the same reference numerals.

DETAILED DESCRIPTION OF THE DRAWINGS

This disclosure provides a drilling tool for use with liquid shim and methods of using the same. The drilling tool comprises a drill jig having drill alignment holes indicating the location of holes to be drilled, and an attached heat blanket covering at least a portion of the bottom surface of the drill jig. The heat blanket may also have holes corresponding to and axially aligned with the holes in the drill jig. The tool provides manufacturing time- and cost-efficiencies by serving the dual role of a curing tool and a drill jig, and eliminates the need for separate curing tools and the time and labor involved with the use of separate curing tools. Further, because this single tool can be used in a dual role, greater portability of tools is provided during cure and drilling.

Figure 1:
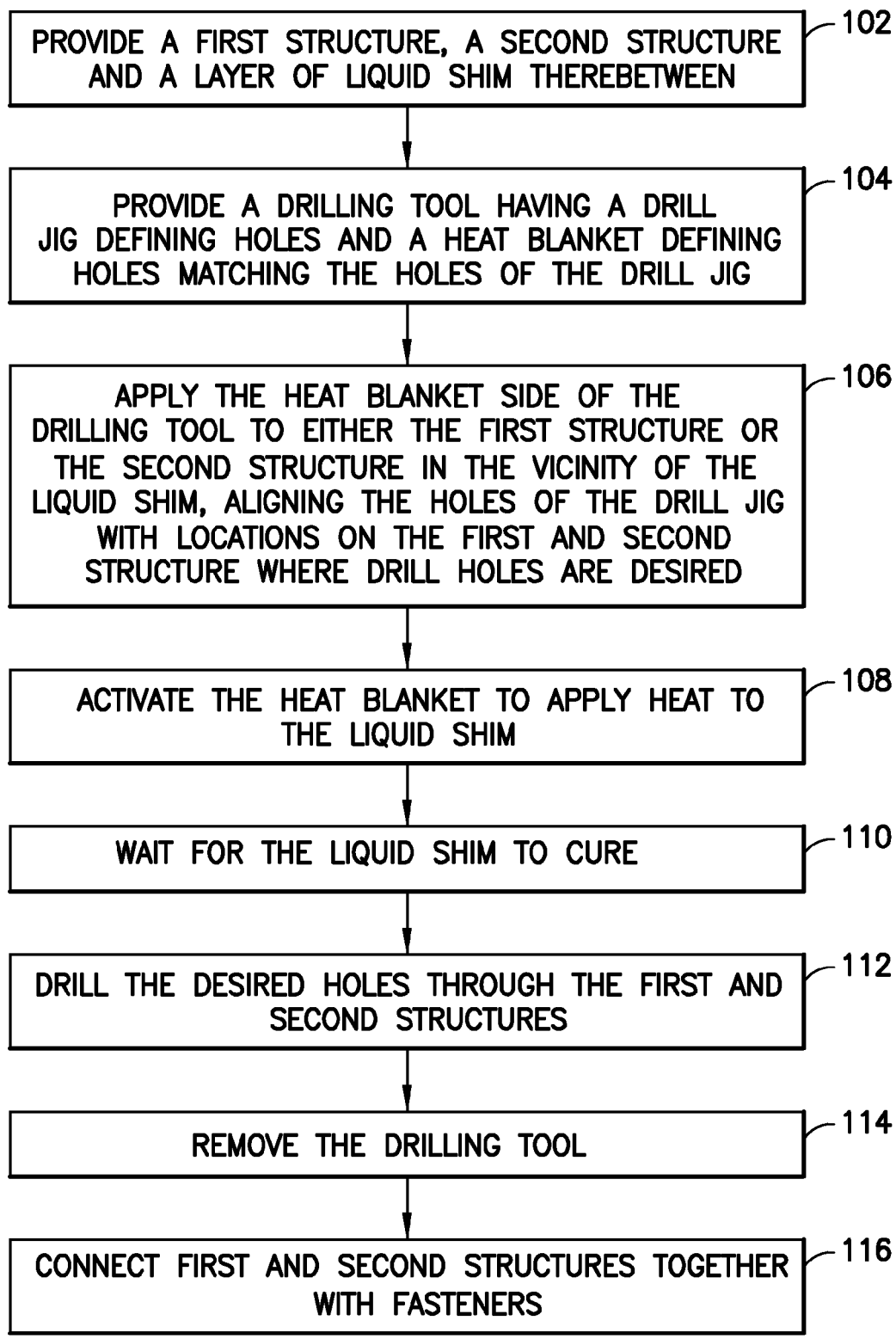
FIG. 1 is an illustration of steps for utilizing a drilling tool for drilling holes and curing liquid shim.

Referring now to FIG. 1, a method of utilizing a drilling tool for drilling holes and curing liquid shim at an elevated temperature is shown and described. Reference will also be made to FIGS. 2A-6B, which depict an exemplary setup in which a drilling tool is utilized, and to FIGS. 7A-7C, which depict several additional embodiments of the drilling tool.

Figure 2A:
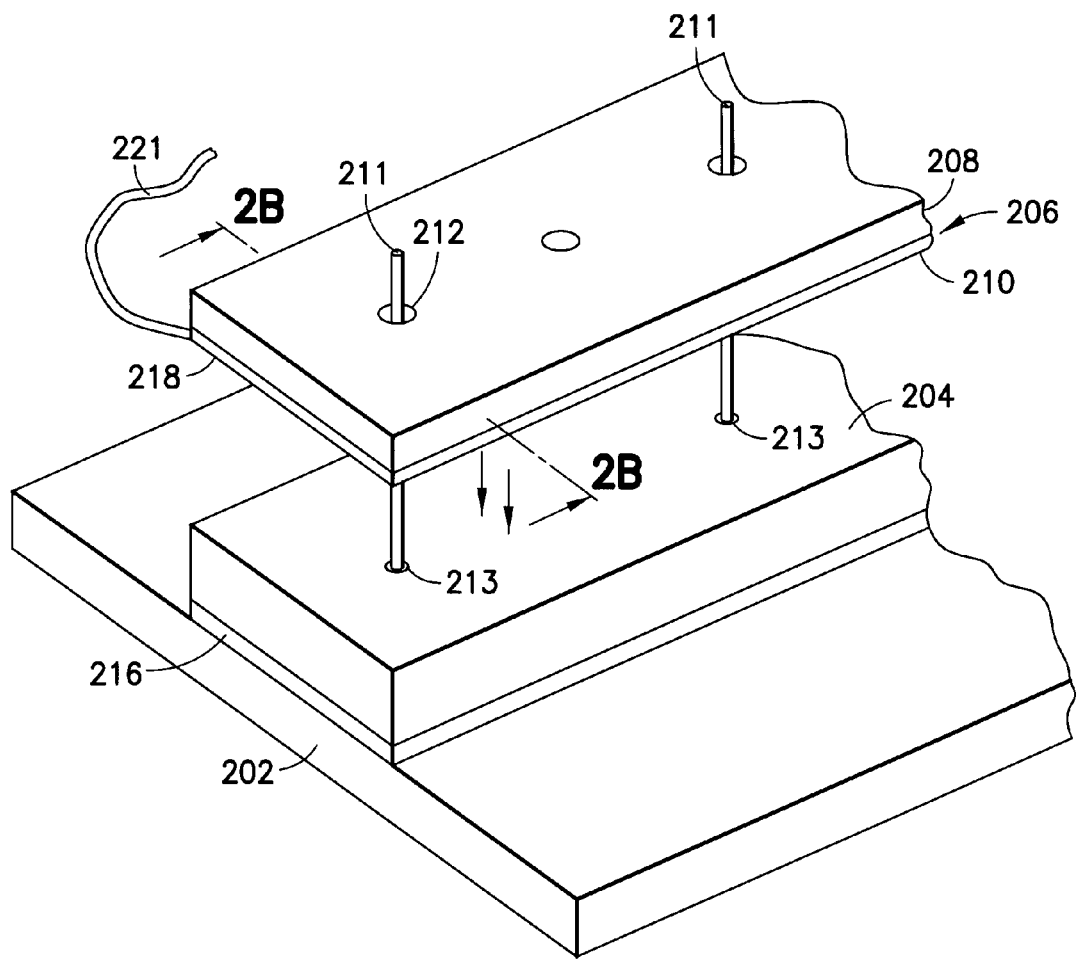
FIG. 2A is an illustration showing an isometric view of a drilling tool prior to application to structures to be joined.
Figure 2B:
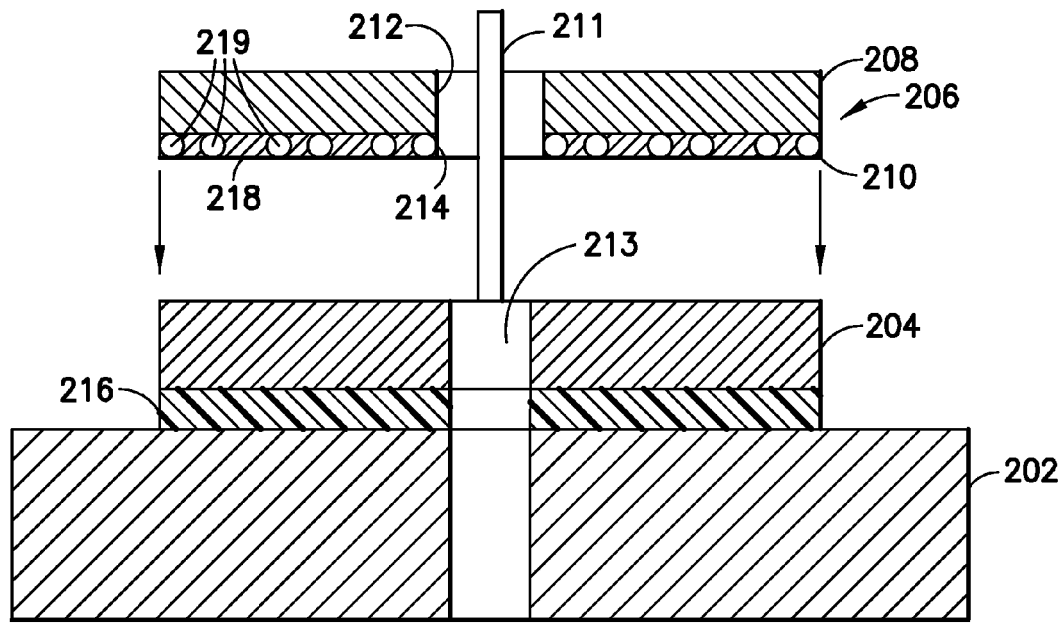
FIG. 2B is an illustration showing a cross-section taken along lines 2B-2B in FIG. 2A.

In step 102, and referring to FIGS. 2A and 2B, a first structure 202, a second structure 204, and a layer of liquid shim 216 are provided. The first structure 202 and second structure 204 comprise an assembly to be joined together by bolts or other fastening methods requiring holes to be drilled. In such assemblies, undesirable voids or gaps may be present between the first 202 and second structures 204.

To fill such voids, a liquid shim 216 may be used. A typical liquid shim 216 consists of an epoxy-based material that possesses high compressive strength. Such liquid shims 216 are typically used to fill voids below a certain thickness. One example of a commercially available liquid shim suitable for carbon composites is HYSOL™ Brand Liquid Shims, available from Hysol Corporation of Bay Point, Calif.

The first 202 and second structures 204 to be joined may be any of a wide variety of materials. The drilling tool 206 of this disclosure is particularly beneficial in the context of joining carbon composite structures together, as they allow sufficient heat transfer to be conducted from the heat blanket to the layer of liquid shim. However, the drilling tool may be used with any material that conducts heat sufficiently or with any other material with which a heat blanket can sufficiently heat an underlying layer of liquid shim.

The tool 206 is also particularly beneficial in the context of carbon composites used for aerospace components, due to strict part size tolerances which may create voids or gaps. It should be understood, however, that the drilling tool may be used to apply heat to, and thus accelerate curing of, liquid shims in any context in which such shims are used.

The liquid shim 216 is applied to one of the two structures and the structures are coupled together. If needed, pressure may be applied to the structures to squeeze out any unnecessary liquid shim 216. Optionally, liquid shim 216 may be applied by a device such as a syringe, after the structural elements 202, 204 are coupled together.

In step 104, a drilling tool 206 comprising a drill jig 208 coupled to a heat blanket 210 is provided. The drill jig 208 is provided to facilitate quick and accurate placement and drilling of holes in structures 202, 204, and may be made from a rigid material such as aluminum or fiberglass, or for uneven or contoured parts, may be made from a flexible material such as rubber to conform to the surface of the parts. The shape, size and configuration of the drill jig 208 may be determined by the shape, size, configuration and location of the structures to be joined used.

The drill jig 208 defines one or more holes 212, which indicate the location of, and facilitate drilling holes in, an underlying structure. The drill jig 208 assists in aligning drill holes based on a pre-determined drilling configuration. The drill jig therefore has at least one hole 212 through which holes will be drilled into structural elements 202, 204. The drill jig 208 also has a feature for locating and orienting the jig 208 on the structures. This feature may comprise coordination holes and tooling pins. In FIGS. 2A and 2B, tooling pins 211 are shown inserted through holes 212 in the drill jig 208 and aligned with a set of coordination holes 213 present on first and second structures 202, 204, in order to properly align holes 212 on the tool 206 with points on the structures 202, 204 at which holes are to be made. The coordination holes 213 may comprise a small subset of the total number of holes to be drilled and may be undersized holes. Alternatively to the tooling pins 211, Cleco type temporary fasteners may be inserted through holes in the drill jig and into the coordination holes 213 in the structures 202, 204. Clecos are a type of temporary fastener used in place of a rivet, and consist of a cylindrical shaft housing a pin. The pin is spring loaded and has a head and a tail with prongs. The Cleco is inserted tail-first through two structures to be joined. When the head is depressed, the prongs extend out of the Cleco, and when the head is subsequently released, the prongs are retracted, but extend outwards and catch the surface of one of the structures, thereby holding the Cleco in place. A flange proximal to the head affixes the Cleco to the other structure, thereby holding the two structures in place against each other.

To use a drill jig 208, the drill jig 208 is placed over a location on the structures 202, 204 requiring holes and aligned such that holes 212 in the drill jig 206 correspond to areas on the structures that require holes. If the structures do not include a liquid shim, and no curing is required, a drill can be used to drill holes in the structures through the holes in the drill jig 208.

The heat blanket 210 may be any of a variety of materials that can provide sufficient heat through a structure for curing a liquid shim 216. One suitable type of heat blanket 210 consists of a silicone rubber pad 218 containing a grid of wound resistance wire 219 vulcanized between two layers of fiberglass reinforced silicone rubber. Suitable heat blankets are available, for example, from Heatcon Composite Systems of Seattle, Wash. The heat blanket 210 may be powered by an external power source (not shown) connected with one or more wires 221 extending from the heat blanket 210. The outer ends of the wires 221 may be fitted with any type of commercially available means for connecting the wires to the power source, such as a plug or other quick-release type of connectors. The wires may be fitted with protective material to prevent damage caused by heat from the heat blanket.

The heat blanket 210 is formed to have a shape which corresponds to the shape of the drill jig 208, and has holes 214 which correspond to the holes 212 in the drill jig 208. The drilling tool 206 therefore has holes 212, 214 passing through both components of the tool—heat blanket 210 and drill jig 208. The holes in the heat blanket are substantially axially aligned with and are of at least the diameter of the holes in the drill jig. This configuration allows drilling holes into the structure while the drilling tool 206 is in place.

The heat blanket may cover the entire bottom surface surrounding the holes in the drill jig, or may cover only a portion of the bottom surface. Thus the heat blanket may be a continuous layer of heat blanket, or may comprise a set of strips spaced along the length or width of the drill jig, or having some other similar configuration to cover at least a portion of the bottom surface of the drill jig, provided the holes in the drill jig are not covered. The heat blanket may also comprise a strip that is thinner than the length or width of the drill jig.

One consideration in deciding the shape of the heat blanket is heat distribution. It is beneficial for a sufficient amount of heat from the heat blanket to reach all areas of the layer of liquid shim such that the liquid shim cures in the desired amount of time. This is particularly true for those portions of the layer of liquid shim proximal to the locations at which the holes are to be drilled.

One way to help ensure sufficient heat transfer to the layer of liquid shim is to provide a heat blanket shaped to be directly above the entire layer of liquid shim. This ensures a source of heat directly above all portions of the liquid shim layer. However, such a configuration may not be necessary, because heat may be transmitted from the heat blanket to locations that are not directly under the heat blanket. It may therefore be acceptable to use a heat blanket that does not fully cover the liquid shim layer. However, the heat blanket preferably covers a sufficient amount of the liquid shim to provide enough heat to cure the entire area of the liquid shim. The amount of heat blanket required will depend on the material of the structures, the thickness of the structures, the shape of the structures, and on other factors. For example, because the amount of heat provided to the liquid shim decreases as the distance between heat blanket material and the liquid shim layer increases, structures having a greater thickness may require more heat blanket material to be present directly over the layer of liquid shim.

Figure 7A:
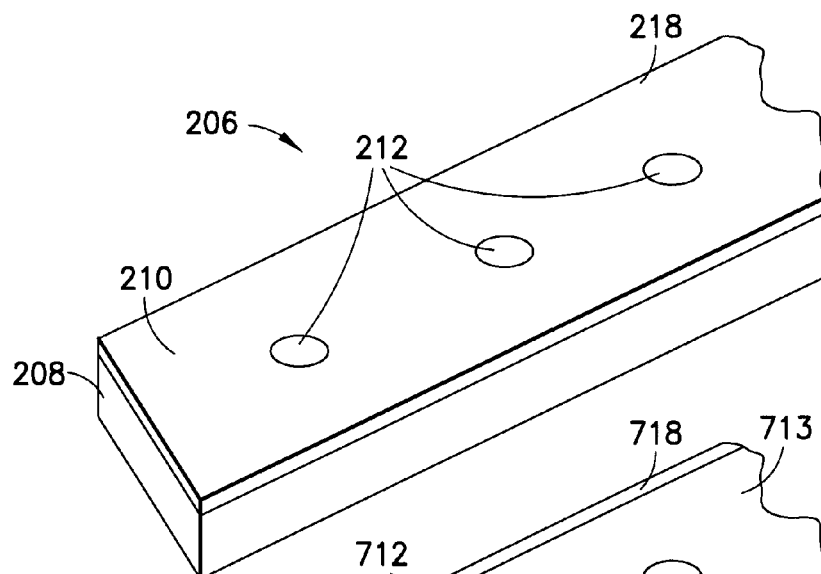
FIG. 7A is an illustration showing an isometric view of a first embodiment of a drilling tool, depicted with the bottom side facing up.
Figure 7B:
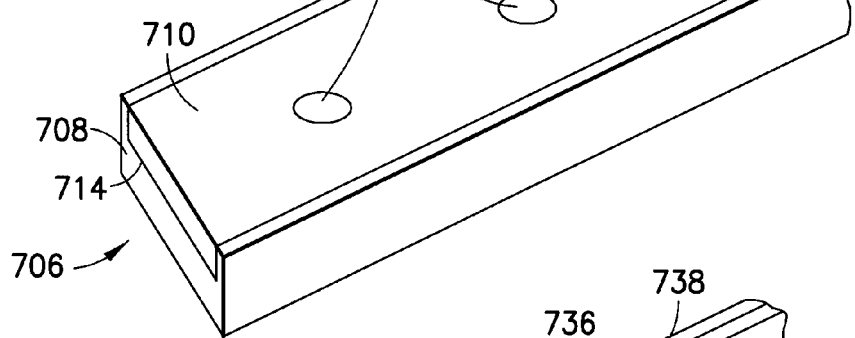
FIG. 7B is an illustration showing an isometric view of a second embodiment of a drilling tool, with a recess for a heat blanket, depicted with the bottom side facing up.
Figure 7C:
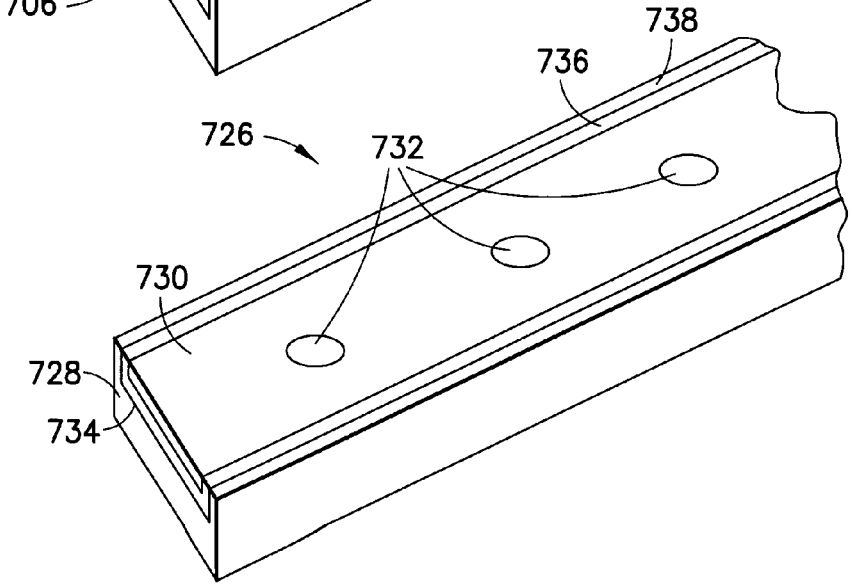
FIG. 7C is an illustration showing an isometric view of a third embodiment of a drilling tool, with a recess for a heat blanket and a layer of insulating material between the heat blanket and the drill jig, depicted with the bottom side facing up.

FIGS. 7A-7C depict several embodiments of drilling tools in a bottom-up orientation.

FIG. 7A depicts a first embodiment of a drilling tool—the drilling tool 206 shown in FIGS. 2A-6B—which comprises a heat blanket coupled to a flat bottom surface of a drill jig as described above. The bottom surface (also referred to as the "heat blanket side") 218 of the drilling tool 206 is shown pointing upwards. The shape and size of the heat blanket 210 is preferably matched to the shape and size of the drill jig 208, such that the bottom surface of the heat blanket 210 is the bottom surface of the drilling tool 206.

FIG. 7B depicts an embodiment of a drilling tool 706 in which a drill jig 708 is provided with a recess 714 in at least a portion of the bottom surface of the drill jig 708, surrounded by a border 718 formed by the bottom surface of the drill jig. The recess should be deep enough to permit a heat blanket 710 to fit snug in the recess such that a bottom surface 713 of the heat blanket is flush with the border of the bottom surface of the drill jig 708. Thus, the bottom surface of the drilling tool is composed of the bottom surface 713 of the heat blanket 710 and the border 718. Therefore, when the drilling tool 706 is in an installed configuration (that is, against a structure to be heated), the heat blanket and border of the bottom surface sit flush against the structure.

FIG. 7C depicts an embodiment of a drilling tool 726 in which a drill jig 728 has a recess 734 similar to the embodiment shown in FIG. 7B. In this embodiment, the recess 734 is covered by a layer of insulating material 736 to prevent a substantial amount of heat from being transferred from the heat blanket 730 to the drill jig 728. This is beneficial for many reasons if, for example, the drill jig 728 is a good conductor of heat, or if the drill jig 728 is made of a material that can be warped, melted, or otherwise adversely affected by being exposed to a high temperature. An insulating material may also be employed between the heat blanket 210 and drill jig 208 shown in FIG. 7A.

In each of the embodiments of the drilling tools 206, 706, 726 depicted in FIGS. 7A, 7B and 7C, holes may be made through the heat blanket by punching, cutting or drilling. The heat blanket may also be specially manufactured to have such holes. If the holes are punched, cut or drilled out of the heat blanket, electrically and/or thermally insulating material may be used to prevent exposure of internal heating elements within the blanket. The heat blanket may be bonded with an adhesive or mechanically fastened with appropriate fasteners to the drill jig.

In FIGS. 2A and 2B, a first structure 202, a second structure 204, and a drilling tool 206 are depicted. Drilling tool 206 is depicted as comprising drill jig 208 and heat blanket 210, both of which have holes 212, 214 extending therethrough. First structure 202 and second structure 204 are depicted with a layer of liquid shim 216 disposed therebetween. The liquid shim 216 in this configuration is uncured.

Figure 3B:
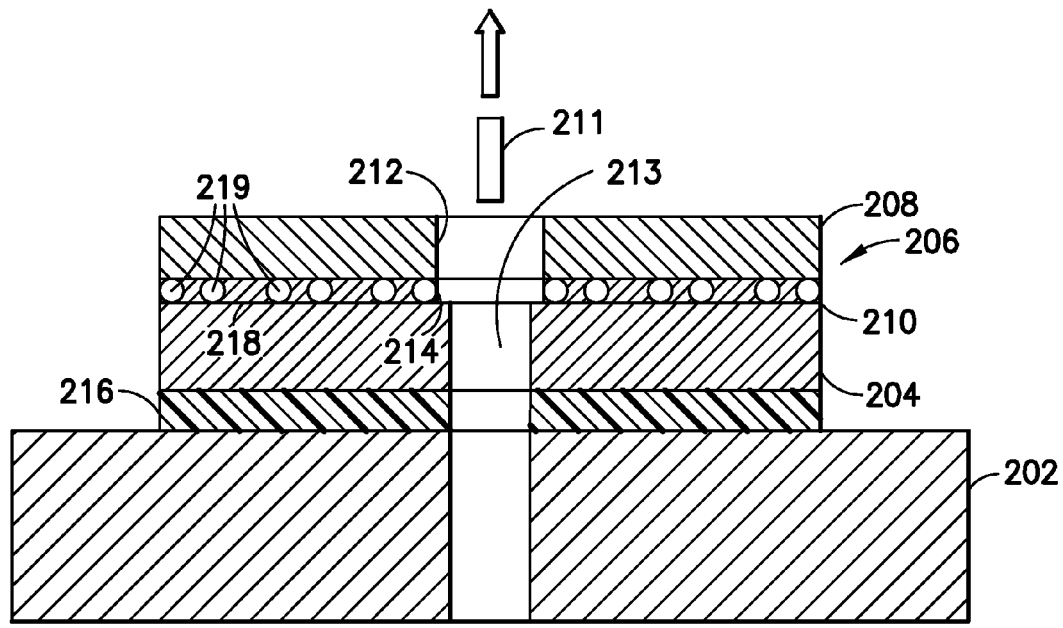
FIG. 3B is an illustration showing a cross-section taken along lines 3B-3B in FIG. 3A.
Figure 3A:
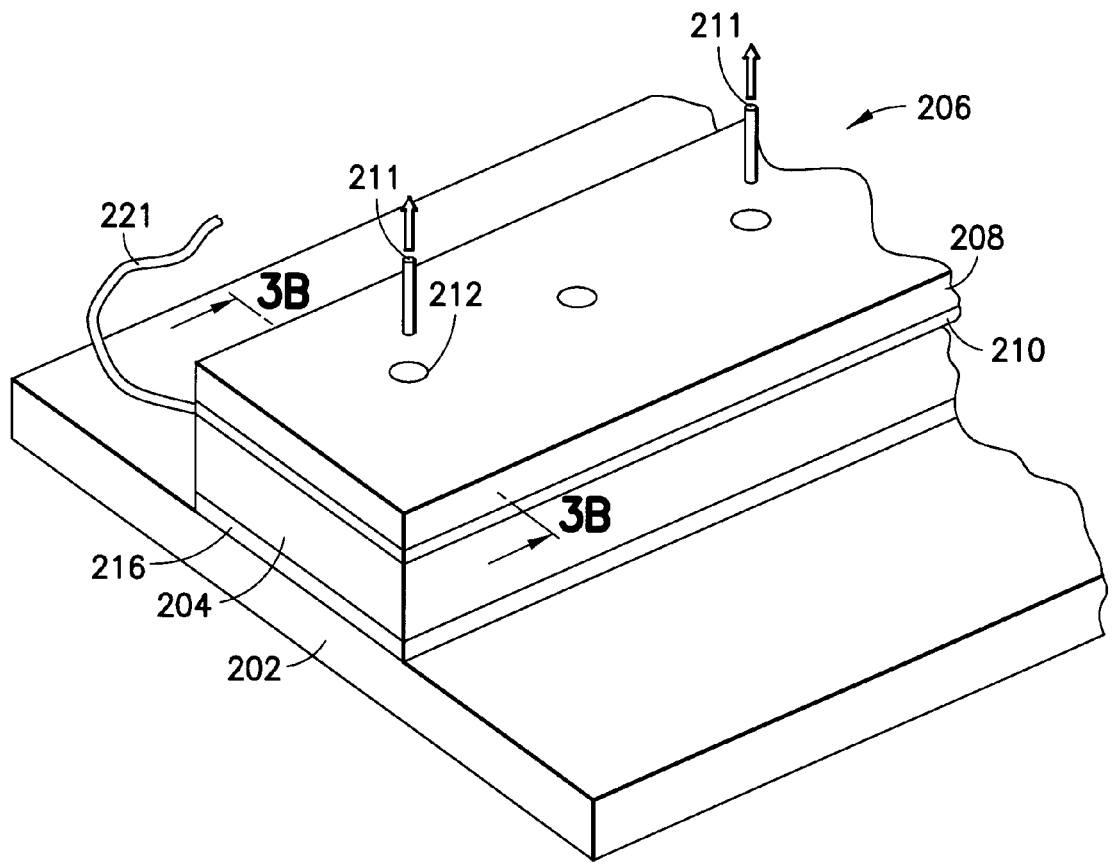
FIG. 3A is an illustration showing an isometric view of a drilling tool applied to structures to be joined.

In step 106, and as shown in FIGS. 3A and 3B, the drilling tool 206 is coupled to either the first structure 202 or second structure 204 (to the second structure 204 in FIGS. 3A and 3B), with the heat blanket 210 side 218 of the tool facing the structure 204 so that heat may be applied directly to the structure 204. The holes 212 of the tool 206 are aligned with points on the structure 204 at which holes are to be drilled.

The drilling tool 206 may be attached to first structure 202 or second structure 204 either through the use of an adhesive or through a physical attachment mechanism.

In step 108, the heat blanket 210 is activated to apply heat to the liquid shim 216, through the structure 204, and accelerate the curing thereof. For a typical thermoset liquid shim 216 such as an epoxy based liquid shim 216, curing can be completed at approximately 140° F. in approximately 1 hour. Without heat-based acceleration, room temperature cure of a similar liquid shim 216 could take approximately 9 hours or more. The tool 206 therefore provides great benefit in terms of reduction in manufacturing time. The tool 206 may be used without activation of the heat blanket 210 in situations where the heat blanket 210 is not needed.

In step 110, after the heat blanket 210 is activated, the liquid shim 216 is left to cure for a pre-determined amount of time.

Figure 4A:
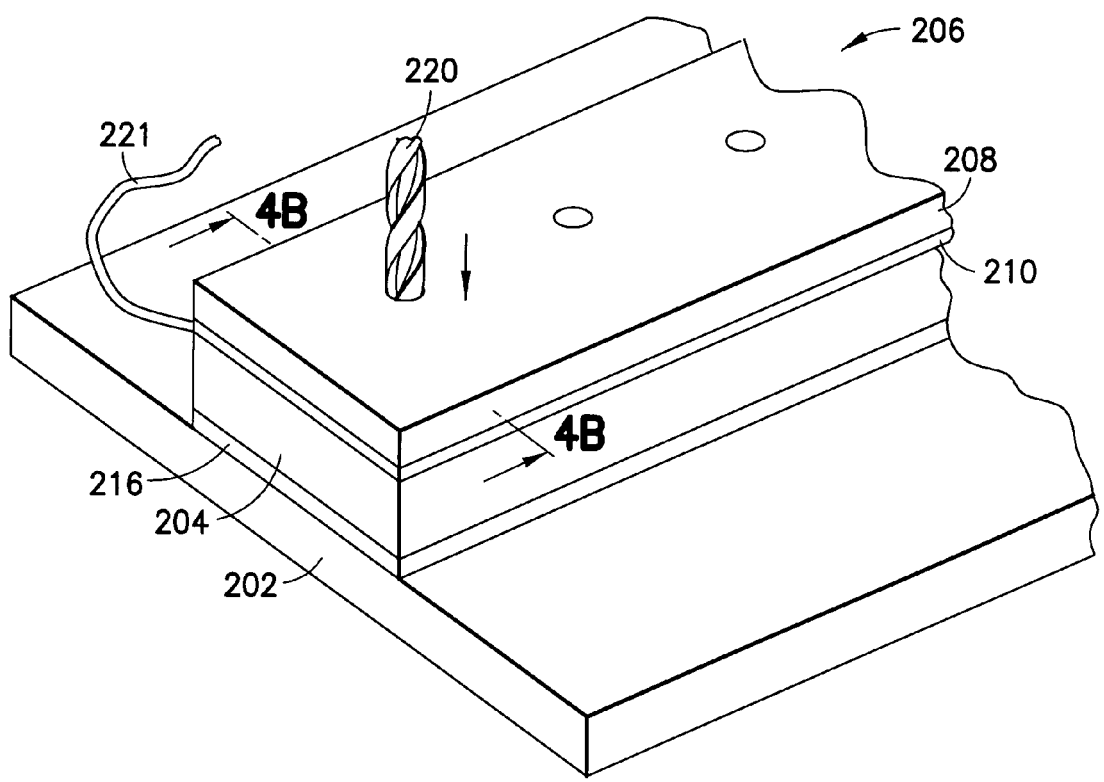
FIG. 4A is an illustration showing an isometric view of a drilling tool applied to structures to be joined, showing holes being drilled into the structures.
Figure 4B:
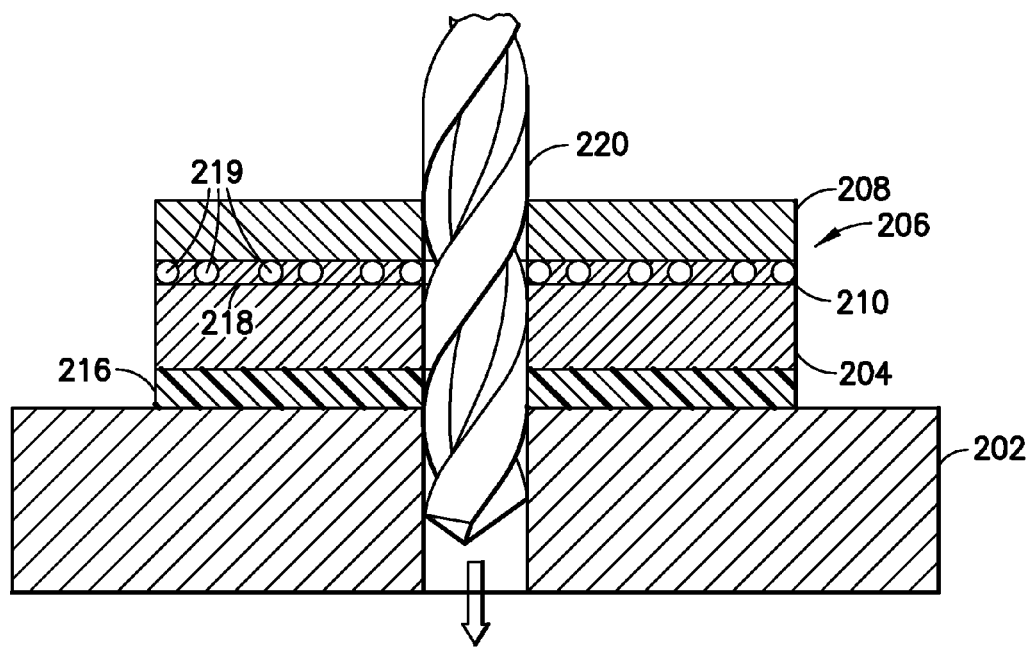
FIG. 4B is an illustration showing a cross-section taken along lines 4B-4B in FIG. 4A.

In step 112, and as depicted in FIGS. 4A and 4B, after the liquid shim has cured, drill 220 is used to drill holes through the structures 204 and 202 and the liquid shim 216, as indicated by holes 212, 214. If small diameter coordination holes are present, these holes may be opened up to full size.

Figure 5B:
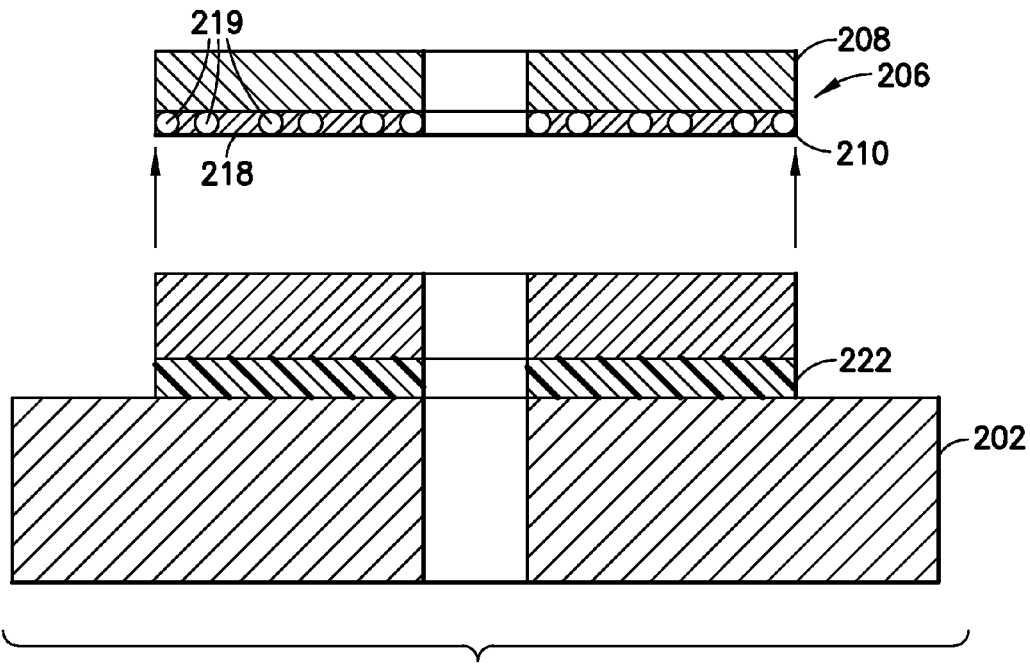
FIG. 5B is an illustration showing a cross-section taken along lines 5B-5B in FIG. 5A.
Figure 5A:
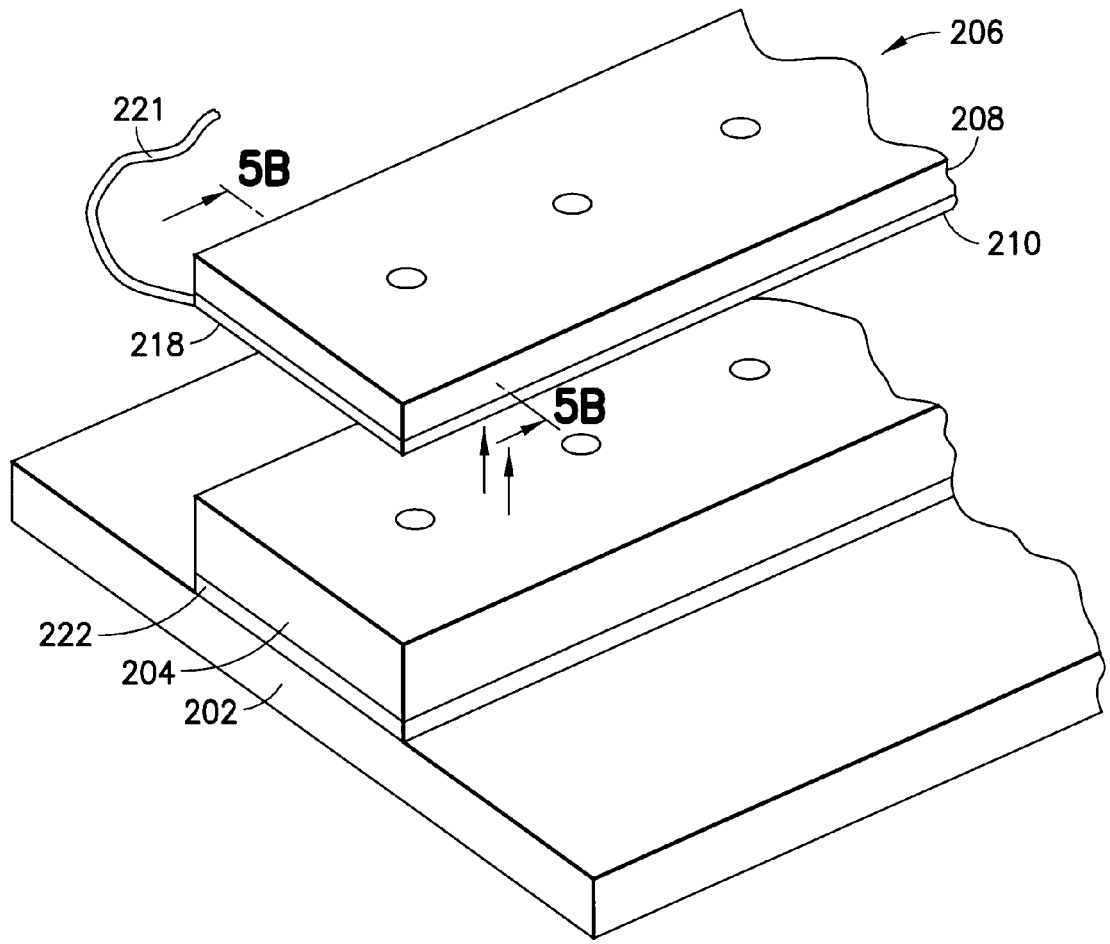
FIG. 5A is an illustration showing an isometric view of a drilling tool being removed from structures to be joined, showing holes drilled in the structures.

In step 114, and as depicted in FIGS. 5A and 5B, the drilling tool 206 is removed. This leaves the first 202 and second structures 204, and a layer of cured shim 222, all having holes drilled through the desired locations.

Figure 6A:
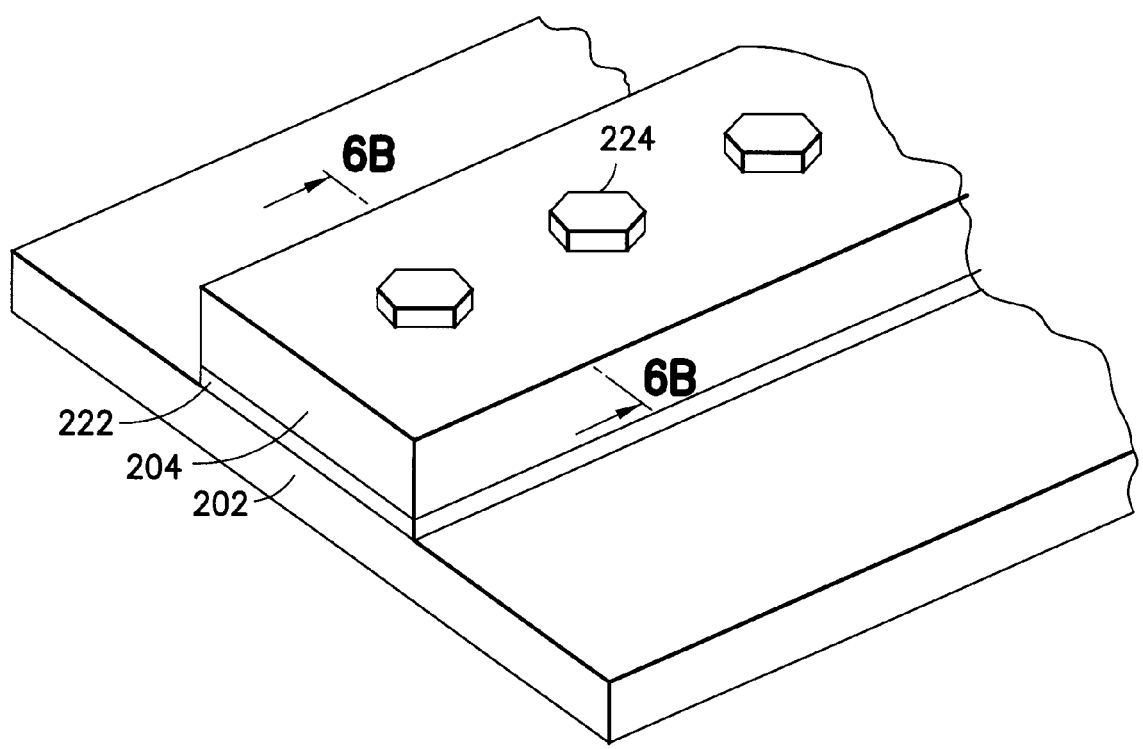
FIG. 6A is an illustration showing an isometric view of a first and second structure joined together with fasteners secured in holes formed using the teachings of this disclosure.
Figure 6B:
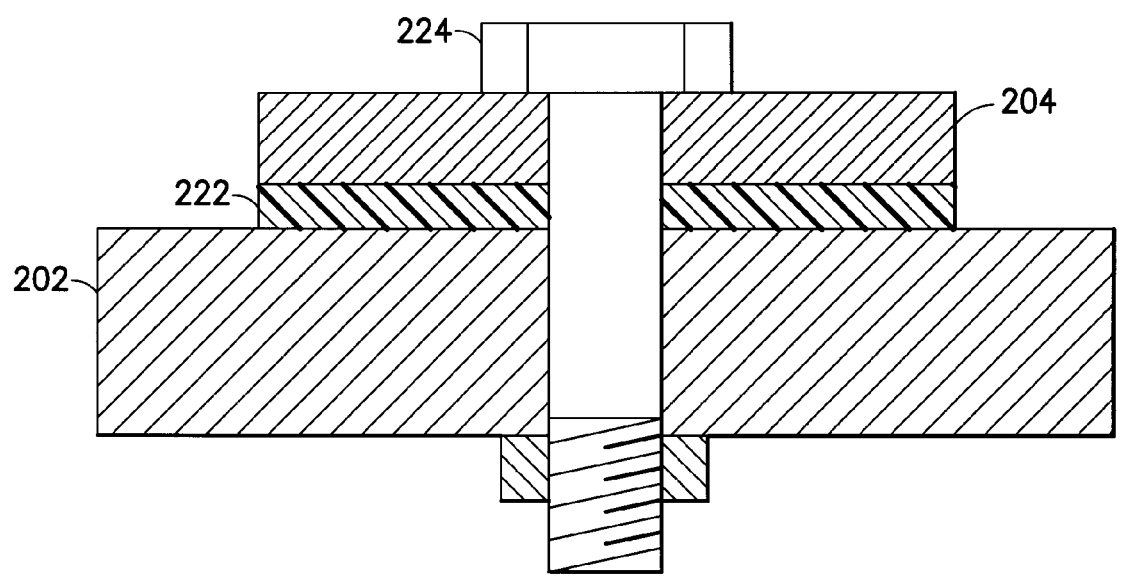
FIG. 6B is an illustration showing a cross-section taken along lines 6B-6B in FIG. 6A.

In step 116, and as depicted in FIGS. 6A and 6B, the first structure 202 and second structure 204 and layer of cured shim 222, now having holes therethrough, may be connected by fasteners 224. Fasteners 224 may comprise threaded bolts with nuts wherein the bolt is passed through the holes in the first structure 202 and second structure 204 and retained with a nut. Fasteners 224 may alternatively comprise any of a variety of fasteners suitable for connecting two structures through a hole.

It should be understood that the structures depicted in FIGS. 2A-6B are merely exemplary, and that the drilling tool described above may be used for a wide variety of structure types, shapes and hole configurations.

The drilling tool which is the subject of this disclosure thus allows the application of a heating element and a drill alignment tool (drill jig) in a simple, straightforward manner, without the need for multiple part changes. This saves time, labor and monetary costs, and reduces the complexity of the drilling procedure where liquid shim is needed. Further, the high temperature curing of liquid shim facilitated by this disclosure greatly reduces the time necessary for forming parts requiring such liquid shim.

While the disclosure has been described with reference to various embodiments, it will be understood by those skilled in the art that various changes may be made and equivalents may be substituted for elements thereof without departing from the scope of the disclosure. In addition, many modifications may be made to adapt a particular situation to the teachings of the disclosure without departing from the essential scope thereof. Therefore it is intended that the disclosure not be limited to the particular embodiment disclosed herein contemplated for carrying out the methods of this disclosure, but that the disclosure will include all embodiments falling within the scope of the appended claims.

The invention claimed is:

1. A tool for drilling holes through first and second structural members having a layer of liquid shim disposed between the first and second structural members, the tool comprising a drill jig having apertures defining a location for the holes to be drilled in the structural members and a heat blanket coupled to at least a portion of a bottom surface of the drill jig, the heat blanket comprising a rubber pad enclosing a grid of wound resistance wire, the tool being coupled to one of the structural members in an area proximate the liquid shim.

2. The tool of claim 1, wherein the heat blanket has apertures substantially axially aligned with the apertures defined by the drill jig, the apertures in the heat blanket having a diameter at least as large as a diameter of the apertures defined by the drill jig.

3. The tool of claim 1, wherein the heat blanket is coupled to a recess formed in a bottom surface of the drill jig such that a bottom surface of the heat blanket is flush with a bottom surface of the drill jig.

4. The tool of claim 1, further comprising an insulation layer coupled between the drill jig and the heat blanket.

5. The tool of claim 1, wherein:
the drill jig is made from a material selected from the group consisting of metal, plastic or rubber.

6. The tool of claim 1, wherein:
the heat blanket is configured to provide a temperature of at least approximately 140 degrees Fahrenheit to the layer of liquid shim.

7. A method of drilling holes in first and second structural members having a layer of liquid shim disposed therebetween, the method comprising:
providing a tool for drilling comprising a drill jig having holes corresponding to the holes to be drilled in the structural members, the drill jig being coupled to a heat blanket covering at least a portion of a bottom surface of the drill jig;
coupling the tool to one of the structural members in an area proximate the liquid shim;
activating the heat blanket to raise the temperature of the liquid shim past a curing temperature for a pre-determined period of time; and
drilling holes, through the holes in the drill jig, into the structural members and the liquid shim.

8. The method of claim 7, wherein:
the heat blanket defines holes substantially axially aligned with the holes defined by the drill jig and of at least a diameter of the holes defined by the drill jig.

9. The method of claim 8, further comprising removing the tool from the structure members.

10. The method of claim 8, wherein the temperature of the liquid shim is raised to at least approximately 140 degrees Fahrenheit.

11. The method of claim 8, wherein the heat blanket is coupled to a recess formed in a bottom surface of the drill jig such that a bottom surface of the heat blanket is flush with a the bottom surface of the drill jig.

12. The tool of claim 7, wherein an insulation layer is provided between the drill jig and the heat blanket.

* * * * *